United States Patent
France

(10) Patent No.: US 6,595,161 B2
(45) Date of Patent: *Jul. 22, 2003

(54) HEELER ROPE

(76) Inventor: Beth Ann France, Rte. 1, Box 99A, Masontown, WV (US) 26542

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/871,184

(22) Filed: May 31, 2001

(65) Prior Publication Data

US 2001/0047772 A1 Dec. 6, 2001

Related U.S. Application Data

(60) Provisional application No. 60/208,243, filed on May 31, 2000.

(51) Int. Cl.[7] .................................................. A01K 15/04
(52) U.S. Cl. ........................................ 119/805; 119/801
(58) Field of Search ................................. 119/805, 792, 119/795, 801, 810, 811, 814; D30/153, 154, 151

(56) References Cited

U.S. PATENT DOCUMENTS

| 2,563,533 | A | * | 8/1951 | Knox | 119/805 |
|---|---|---|---|---|---|
| 2,669,221 | A | * | 2/1954 | Major | 119/805 |
| 3,891,257 | A | * | 6/1975 | Wilson | 292/262 |
| 4,140,412 | A | * | 2/1979 | Vitt | 403/28 |
| 4,648,352 | A | * | 3/1987 | Smith | 119/805 |
| 4,928,634 | A | * | 5/1990 | Voigt | 119/805 |
| 5,827,069 | A | * | 10/1998 | Mauricio | 434/225 |
| 6,044,801 | A | * | 4/2000 | Chavez | 119/805 |
| 6,142,104 | A | * | 11/2000 | Sullivan | 119/805 |

* cited by examiner

Primary Examiner—Peter M. Poon
Assistant Examiner—Joan M. Olszewski
(74) Attorney, Agent, or Firm—Steptoe & Johnson PLLC

(57) ABSTRACT

A heeler rope having a shortened length such that dallying is not required to remove slack from the heeler rope after roping a steer's hind legs. The heeler rope also has a braided portion that facilitates attaching the heeler rope to a hector on a roper's saddle.

23 Claims, 1 Drawing Sheet

HEELER ROPE

This application claims the benefit of Provisional application Ser. No. 60/208,243, filed May 31, 2000.

BACKGROUND OF THE INVENTION

1. Field of the Invention

This invention relates to a rope used in team roping, and more particularly to an improved heeler rope that does not require dallying.

2. Related Art

Team roping is a rodeo event in which two cowboys compete as partners. While on the run, a steer is first roped by the "header" who ropes the steer's horns. The header then wraps or "dallies" the rope around the saddle horn and turns the steer across the arena. The "heeler" moves into position behind the steer and ropes the moving hind legs of the upright animal. The heeler then dallies the rope around the saddle horn. The clock stops when both horses are facing each other and the ropes are taught, securing the steer in the middle.

A matter of precision and teamwork, not brute strength or single combat, today's team roping has become a leisure activity enjoyed by urban and rural citizens of every occupation, age, race, sex and skill level. Horse arenas from Hawaii to Connecticut stage roping events as often as two and three times a week. Arena roping is an activity enjoyed by thousands seeking a fun and exciting way to utilize their horses. It is often a family event with grandparents, mothers, dads, sons and daughters alike all teaming together.

Lariats, also called lassos, are used in ranching and rodeos for catching horses and cattle. The term lariat defines a rope having some form of hondo, or knot at one end, which, when the other end of the rope is pulled through the hondo, a loop is formed that is used to encircle and then tighten around the object the lariat is being used to catch. Attached to the hondo is a burner. The burner is a device that is fastened to the lead portion of the hondo on at least the inside portion of the rope for the rope to slide against when the loop is being reduced to tighten on the object being roped. The burner protects the rope from abrading and also makes the rope faster by reducing the friction of the sliding rope. Common burners consist of rawhide sewn onto the hondo.

Ropes for lariats used in team roping have several characteristics that distinguish them from conventional general duty ropes. First, the rope for a lariat used in team roping must be stiffer or harder than conventional general duty ropes. This characteristic is referred to as body, and is often achieved with more twists and by twisting and final winding of the rope under high tension in the manufacturing process. Second, the rope or lariat must feel good in the roper's hand. While feel is a subjective criteria, it is usually a combination of weight, flexibility or stiffness, and smoothness. Third, the rope must have enough weight per inch to feel and throw well. The roper must be able to sense where the leading portion of the loop is, and the rope must have sufficient density for the tip to fly in the direction of the throw. Finally, the surface of the lariat must be smooth and slick enough for the rope to slide quickly on the burner of the hondo as the loop is reduced to tighten around the object of the throw.

While there are several variations to the weight, body, and smoothness of heeler ropes, the length of heeler ropes is an often overlooked variable. Generally, heeler ropes are 35 feet long. While this length is sufficient to allow the heeler to rope the hind legs of a steer when the heeler is seated on his or her horse, the length also results in considerable slack in the rope after roping the steer's hind legs that must be taken up in order to make the rope taught. The extra slack in the rope is usually taken up by dallying the rope around the saddle horn. Unfortunately, dallying requires considerable strength and dexterity and is often difficult for older ropers or those lacking in physical strength.

In an effort to make team roping more enjoyable for ropers of all ages and abilities, a hector can be used as an alternative to dallying for securing the end of the heeler rope after roping a steer's hind legs. Hectors can be used by all non-competitive ropers, and by competitive ropers who are female or over the age of 57.

Conventional heeler ropes are difficult to use with hectors for several reasons. First, conventional heeler ropes are too long to use with hectors because hectors do not provide a means for removing slack from the heeler rope after roping a steer's hind legs. Second, conventional heeler ropes do not have the necessary means for attaching to a hector because conventional heeler ropes are designed to be dallied around a saddle horn.

Therefore, what the art needs is a heeler rope having a shortened length such that when the heeler rope is secured to a hector after roping a steer's hind legs, the rope does not require dallying to remove slack from the rope. The art further needs a heeler rope that is designed to be easily attached to a hector.

SUMMARY OF THE INVENTION

The present invention solves the problems associated with using conventional heeler ropes in conjunction with hectors by providing a heeler rope of optimal length that does not require dallying to make the rope taught after roping the hind legs of a steer. This invention also provides an improved heeler rope that facilitates attaching of the heeler rope to a hector on the roper's saddle.

One aspect of the invention is a heeler rope for use in team roping that includes a rope body with a first end and a second end, wherein the rope body has an optimal length between the first end and the second end such that dallying is not required to remove slack from the rope body after roping a steer's hind legs.

Another aspect of the invention is a heeler rope for use in team roping, including a rope body having a first end and a second end, a hondo located at the first end of the rope body; and a braided portion located at the second end of the rope body, for attaching the rope body to a hector.

Another aspect of the invention is a method of making a heeler rope having a rope body, wherein the rope body has a plurality of strands, a first end, a second end, and a hondo at the first end, comprising the steps of (1) unwinding the plurality of strands at the second end of the rope body; (2) braiding the plurality of strands, thereby making a braided portion having a first end and a second end; (3) making a loop with the braided portion; and (4) tying a knot in the braided portion to secure the loop. Optionally, the loop in the braided portion can be secured by alternative securing means, such as tape or other securing means known to one of ordinary skill in the art. Further, the braided portion can optionally comprise a straight portion and a knot instead of a loop.

A feature of the present invention is a heeler rope that is an ideal length for use in team roping when a hector is used instead of dallying as a means for securing the rope after roping a steer's hind legs.

Another feature of the invention is a heeler rope with a braided portion that facilitates attaching the heeler rope to a hector.

An advantage of the invention is that it permits ropers of all ages and skill levels to participate in team roping because dallying is not necessary to remove slack from the rope after heeling a steer.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
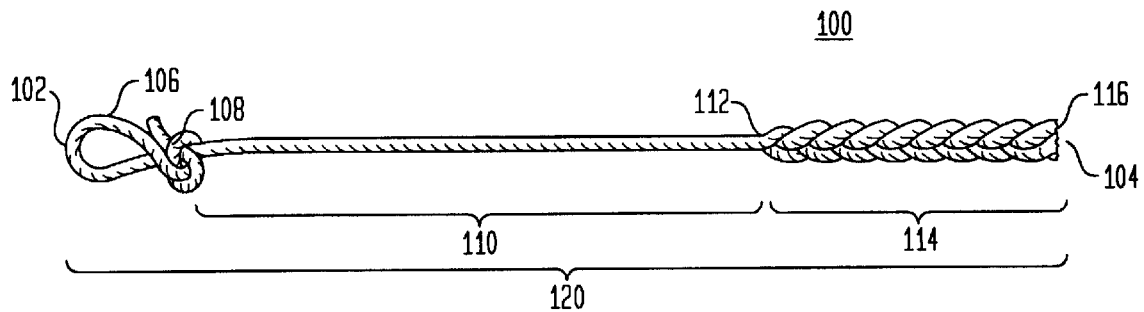
FIG. 1 is a planar side view of a heeler rope of the present invention.
Figure 2:
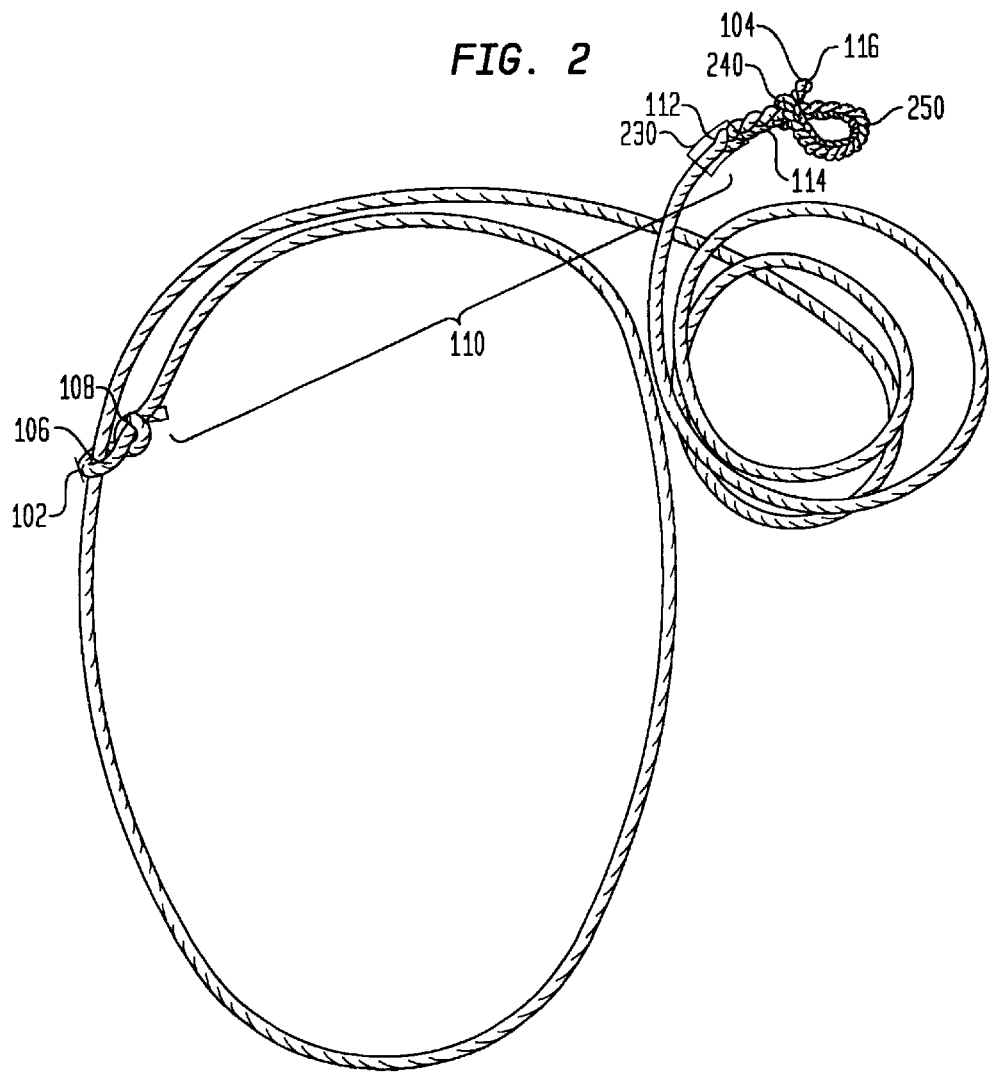
FIG. 2 is a planar side view of a heeler rope of the present invention depicting an embodiment of the means for attaching the rope body to a hector.

FIGS. 1 and 2 illustrate the preferred embodiment of a heeler rope 100 of the present invention. The heeler rope 100 has a rope body 120 that has a length from a first end 102 to a second end 104. It is desirable that the length of the rope body 120 be long enough to allow a heeler to rope the hind legs of a steer from atop his or her horse, but that the length of the rope body 120 be short enough that the rope body can be made taught after roping the steer's hind legs without dallying. A rope body 120 is considered to have an optimal length between its first end 102 and its second end 104 when dallying is not required to remove slack from the rope body 120 after roping a steer's hind legs. Optionally, the optimal length of the rope body 120 is between about 18 feet and about 34.5 feet, between about 18 feet and about 30 feet, or between about 19 feet and about 24.5 feet. Preferably, the optimal length of the rope body 120 is about 22 feet from the first end 102 to the second end 104.

At the first end 102 of the rope body 120, is a hondo 106 and a knot 108 for securing the hondo 106. The hondo 106 and knot 108 are preferably made of about 18 inches of rope, wherein about 12 inches is for the hondo and about 6 inches is for tying the knot 108.

At the second end 104 of the rope body 120, is a braided portion 114. The braided portion 114 has a means for attaching the rope body 120 to a saddle, and more specifically a means for attaching the rope body 120 to a hector. Preferably, the means for attaching is a loop 250, but could optionally be a knot and straight portion of rope body 120. When the means for attaching is a loop 250, a knot 240 is tied in the braided portion 114 to secure the loop 250. Optionally, the loop 250 in the braided portion 114 can be secured by alternative securing means, such as tape, additional braiding, or other securing means known to one of ordinary skill in the art.

The braided portion 114 has a first end 112 and a second end 116. Preferably, the second end 116 of the braided portion 114 corresponds to the second end 104 of the rope body 120. The length of the braided portion 114 is preferably about 19 inches from the first end 112 to the second end 116. The braided portion 114 is made by unwinding approximately 36 inches of the plurality of strands that make up the rope body 120, and then braiding the strands by means known to those of ordinary skill in the art.

Between the knot 108 and the first end 112 of the braided portion 114 is a straight portion 110. The length of the straight portion 110 is optionally between about 14 feet, 5 inches and about 30 feet, 10 inches. Preferably, the length of the straight portion 110 is about 19 feet.

The heeler rope 100 of the present invention comprises 3–4 strands, preferably of nylon. The heeler rope 100 is made by first cutting the second end 104 of the rope body 120 such that the rope body 120 is an optimal length. Second, a desired length (about 19 inches) of strands making up the rope body 120 are unwound. Third, the unwound strands are braided, thereby making a braided portion 114 having a first end 112 and a second end 116. Fourth, a loop 250 is made with the braided portion 114. Finally, a knot 240 is tied in the braided portion 114 at the base of the loop 250 as a means to secure the loop. Preferably, the heeler rope 100 also is manufactured with a hondo 106 at the first end 102 of the rope body 120, but optionally a hondo 106 can be added to the rope body 120 at any time during the process of making the heeler rope 100 of the present invention.

Optionally, a sleeve 230 is placed over the first end 112 of the braided portion 114 to maintain the integrity of the braid. The preferred sleeve 230 is a rubber shrink tubing that encompasses the first end 112 of the braided portion, but this sleeve 230 is used for convenience purposes only. It would be readily apparent to one of ordinary skill in the relevant art to use a comparable sleeve 230. Furthermore, such sleeves 230 are well known in the relevant art, and it would be readily apparent for one of ordinary skill to use one with the present invention.

Preferably the heeler rope 100 of the present invention is made using 3 to 4 strands of a commercially available ⅜" scant nylon, or poly-nylon, rope. Alternatively, other types of rope may be used, such as ⅜" true, ⅜" full, 7/16" full, or 7/16" scant nylon rope, all of which are commercially available. Additionally, the heeler rope can have a stiffness of extra extra soft, extra soft, soft, medium, medium-hard, hard-medium, or hard.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A heeler rope, comprising:
a rope body having a length, a first end, a second end, and a middle point halfway between said first end and said second end, wherein said rope body has an optimal length between said first end and said second end such that dallying is not required to remove slack from said rope body after roping a steer's hind legs;
a hondo at said first end of said rope body; and
a braided portion positioned between said second end of said rope body and a point between said second end and said middle point of said rope body, for attaching said second end of said rope body to a saddle, wherein said braided portion has a length that is within a range of about 4% to about 9% of the length of said rope body and has a loop such that said loop is made of said braided portion and is at said second end of said rope body.

2. The heeler rope according to claim 1, wherein said optimal length of said rope body is between about 18 feet and about 34.5 feet.

3. The heeler rope according to claim 1, wherein said optimal length of said rope body is between about 19 feet and about 24.5 feet.

4. The heeler rope according to claim 1, wherein said braided portion further comprises a knot to secure said loop at said second end of said rope body.

5. The heeler rope according to claim 1, wherein a sleeve is positioned over a first end of said braided portion.

6. The heeler rope according to claim 5, wherein said sleeve is a rubber shrink tubing.

7. The heeler rope according to claim 1, wherein said rope body further comprises a straight portion between said hondo and said braided portion.

8. The heeler rope according to claim 7, wherein said straight portion has a length of between about 15 feet to about 30 feet.

9. The heeler rope according to claim 8, wherein said straight portion has a length of between about 18 feet to about 20 feet.

10. The heeler rope according to claim 1, wherein said rope body is made of nylon.

11. The heeler rope according to claim 1, wherein said rope body is selected from the group consisting of ⅜ inches scant, ⅜ inches true, ⅜ inches full, 7/16 inches scant, and 7/16 inches full.

12. The heeler rope according to claim 1, wherein a stiffness of said rope body is selected from the group consisting of extra extra soft, extra soft, soft, medium, medium-hard, hard-medium, and hard.

13. The heeler rope according to claim 1, wherein the braided portion is about 19 inches long.

14. A method for making a heeler rope, the heeler rope having a rope body having a length, a first end, a second end, and a middle point halfway between the first end and the second end of the rope body, comprising the steps of:
   a. cutting a rope the length, thereby forming the rope body, such that the rope body has an optimal length between the first end and the second end such that dallying is not required to remove slack from the rope body after roping a steer's hind legs;
   b. making a hondo at the first end of the rope body;
   c. unwinding a plurality of strands of the rope at the second end of the rope body to a point between the second end and the middle point of the rope body;
   d. braiding the plurality of strands of the rope, thereby making a braided portion at the second end of the rope body extending from the point between the second end and the middle point to the second end of the rope body, the braided portion having a first end and a second end, wherein the braided portion has a length that is within a range of about 4% to about 9% of the length of the rope body; and
   e. making a loop at the second end of the rope body such that the loop is made of the braided portion.

15. The method for making a heeler rope according to claim 14, further comprising the step of:
   f. tying a knot in the braided portion to secure the loop.

16. The method for making a heeler rope according to claim 14, further comprising the step of:
   f. placing a sleeve over the first end of the braided portion.

17. The method for making a heeler rope according to claim 16, wherein the sleeve is a rubber shrink tubing.

18. The method for making a heeler rope according to claim 14, wherein the optimal length of the rope body is between 18 feet and 34.5 feet.

19. The method for making a heeler rope according to claim 14, wherein the optimal length of the rope body is between 19 feet and 34.5 feet.

20. The method for making a heeler rope according to claim 14, wherein the rope is selected from the group consisting of ⅜ inches scant, ⅜ inches true, ⅜ inches full, 7/16 inches scant, and 7/16 inches full.

21. The method for making a heeler rope according to claim 14, wherein a stiffness of the rope is selected from the group consisting of extra extra soft, extra soft, soft, medium, medium-hard, hard-medium, and hard.

22. The method for making a heeler rope according to claim 14, wherein the braided portion is about 19 inches long.

23. The method for making a heeler rope according to claim 14, wherein about 36 inches of the length of the rope body is unwound in said step (c).

* * * * *